United States Patent [19]

Knecht et al.

[11] Patent Number: 4,931,831
[45] Date of Patent: Jun. 5, 1990

[54] PHOTOGRAPHIC COPYING AND ENLARGING APPARATUS

[75] Inventors: Hugo Knecht, Schöfflisdorf; René Lüscher, Kloten, both of Switzerland

[73] Assignee: Ciba-Geigy Corporation, Ardsley, N.Y.

[21] Appl. No.: 274,962

[22] Filed: Nov. 22, 1988

[30] Foreign Application Priority Data

Dec. 11, 1987 [CH] Switzerland ............... 4848/87

[51] Int. Cl.$^5$ .................................. G03B 27/62
[52] U.S. Cl. ........................................ 355/75
[58] Field of Search ............................ 355/75

[56] References Cited

U.S. PATENT DOCUMENTS

| | | | |
|---|---|---|---|
| 3,369,449 | 2/1968 | Klauss et al. | 355/41 |
| 3,488,120 | 1/1970 | Nagel | 355/75 |
| 3,542,471 | 11/1970 | Dubny | 355/75 |
| 3,942,154 | 3/1976 | Akami et al. | 340/146.3 B |
| 4,080,063 | 3/1978 | Stemmle | 355/75 X |
| 4,087,172 | 5/1978 | Van Dongen | 355/75 X |
| 4,092,067 | 5/1978 | Grossmann | 355/77 |
| 4,101,216 | 7/1978 | Grossmann | 355/35 |
| 4,150,894 | 4/1979 | Meyer et al. | 355/38 |
| 4,166,588 | 9/1979 | Krehbiel et al. | 242/67.1 R |
| 4,270,861 | 6/1981 | Beckman | 355/38 |
| 4,279,505 | 7/1981 | Ursprung et al. | 355/77 X |
| 4,344,708 | 8/1982 | Tokuda | 355/35 X |
| 4,422,752 | 12/1983 | Thurm et al. | 355/41 |
| 4,589,766 | 5/1986 | Fursich et al. | 355/38 |
| 4,610,537 | 9/1986 | Matsumoto | 355/68 |
| 4,666,306 | 5/1987 | Matsumoto | 355/38 X |
| 4,676,628 | 6/1987 | Asbury, III | 355/38 |
| 4,757,351 | 7/1988 | Birgmeir | 355/38 |
| 4,779,987 | 10/1988 | Umemoto et al. | 355/77 X |

FOREIGN PATENT DOCUMENTS

| | | |
|---|---|---|
| 0261074 | 3/1988 | European Pat. Off. |
| 1916989 | 11/1969 | Fed. Rep. of Germany |
| 2632715 | 1/1978 | Fed. Rep. of Germany |
| 119153 | 9/1981 | Japan ............... 355/75 |
| 57-136639 | 8/1982 | Japan |
| 271391 | 1/1951 | Switzerland ........ 355/75 |

OTHER PUBLICATIONS

European Search Report No. 9-16717/17188 2/1989.
"Methoden der Mustererkennung", cover page, Frankfurt/Main, Akad. Verlagsgesellschaft, 1974.
"Detection, Estimation and Modulation Theory", cover page, Van, Trees, New York, Wiley, 1968.
"The Reproduction of Color", p. 284, by R. W. G. Hunt.
"1987 CCD DataBook", p. 232.
Search Report-4848/87-2 Swiss 9/1988.

Primary Examiner—Donald A. Griffin
Attorney, Agent, or Firm—Burns, Doane, Swecker & Mathis

[57] ABSTRACT

In a photographic copy and enlarging apparatus, a film stage is located on a work table. A transportation means for the film comprises a film transport roller placed on the film stage. As viewed in the direction of the film transport, a front and a rear clamping device are provided for the film. The clamping devices are laid out so that they lead to the formation of a loop by the film being held, whereby the length of the film hanging laterally from the work table is shortened by at least one half and does not contact the floor. The clamping devices permit the film transport means to clamp the front end of the film in the rear clamping device and to draw the rear end of the film from the front clamping device.

26 Claims, 7 Drawing Sheets

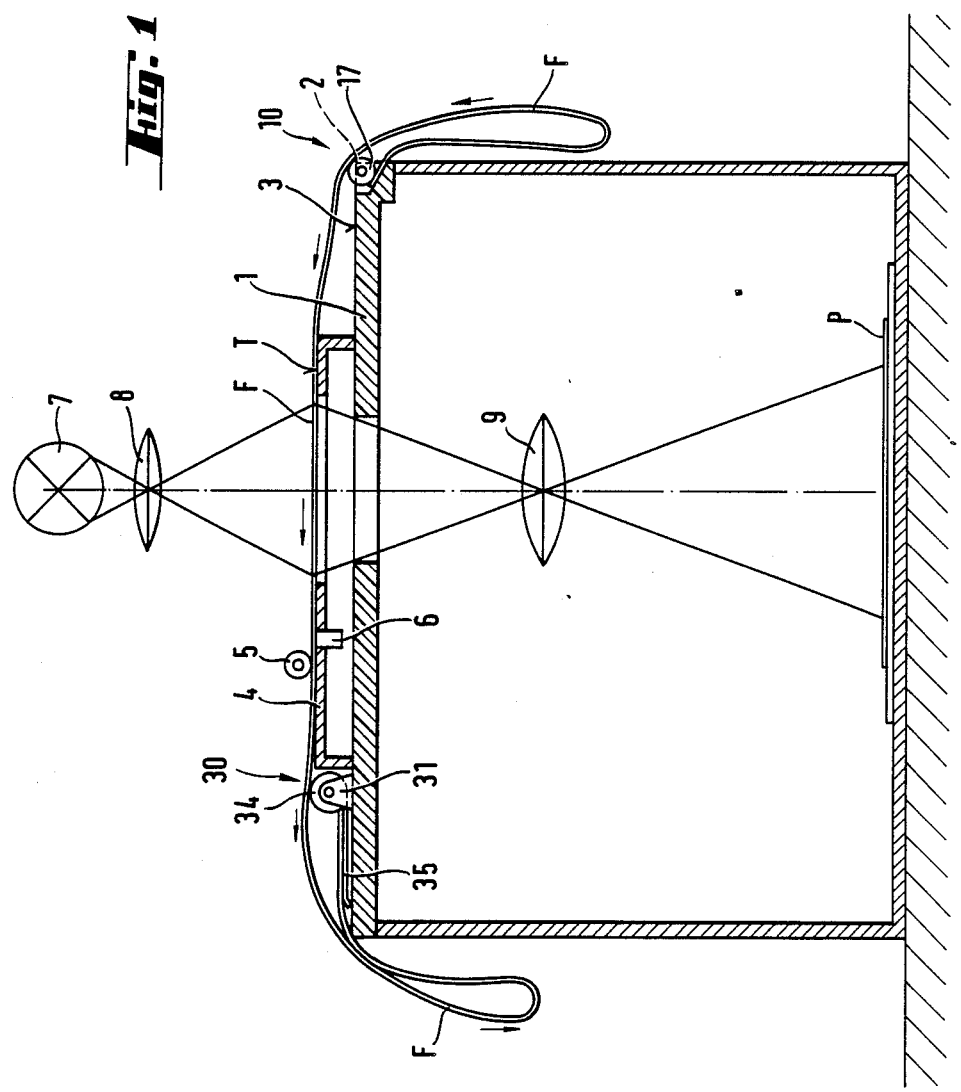

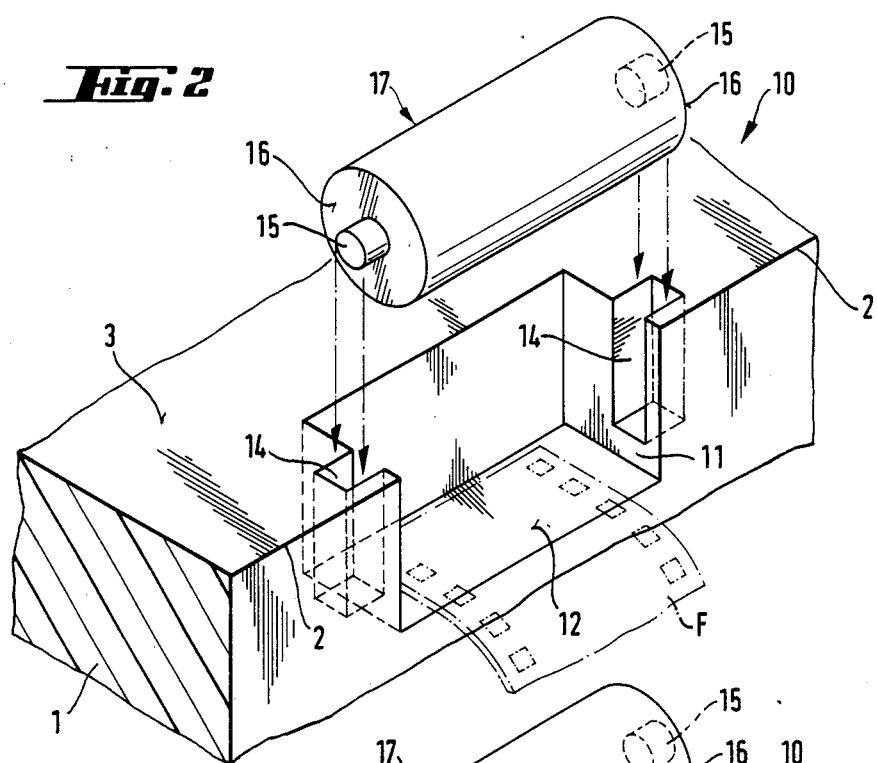
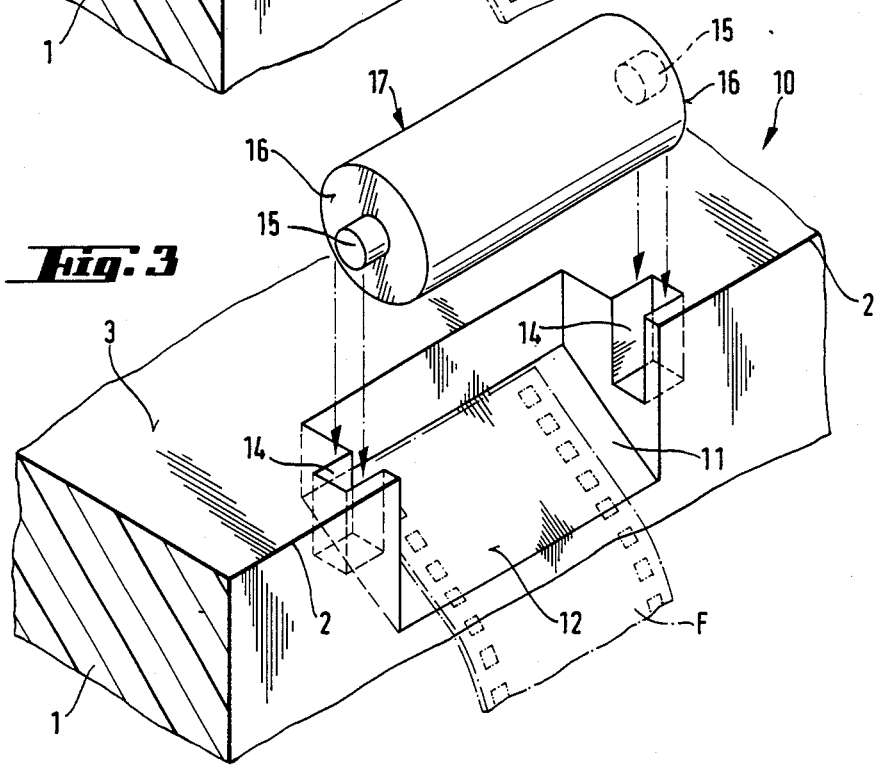

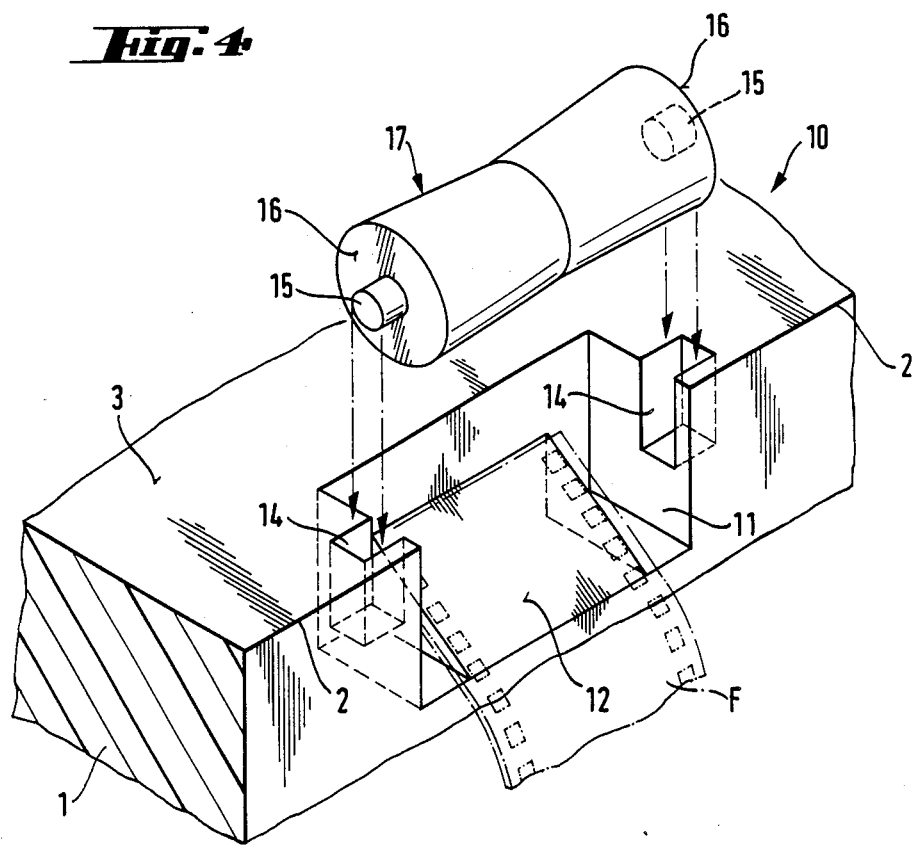

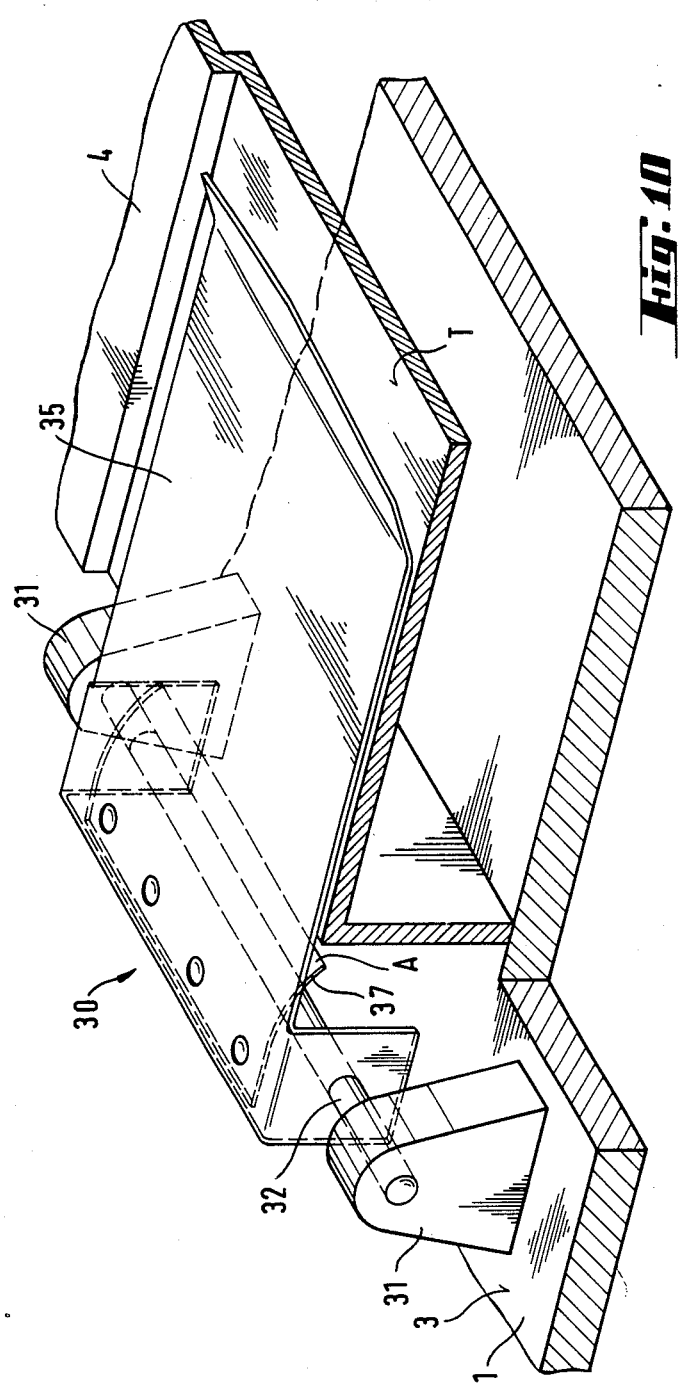

PHOTOGRAPHIC COPYING AND ENLARGING APPARATUS

BACKGROUND OF THE INVENTION

The invention concerns a photographic copying and enlarging apparatus having a work table with a film stage and a film transport means which includes a film transport roller on the film stage.

The trend to install small and very small laboratories in supermarkets, pharmacies and other stores in a decentralized manner, requires a highly compact, combined configuration of the processing devices (i.e., a copy apparatus, a paper processor, a dryer and optionally, a film processor and dryer) in a single unit. In configuring the layout, it must further be considered that the processing devices must be able to pass through standard size doors having a width of 80 cm.

The height of the work table for copying equipment is usually 80 to 100 cm. This working height, together with the compact configuration, results in a condition whereby film strips, which are usually relatively long (for example, in the case of 135 film up to 1.7 m), are in contact with the floor to the left or right of the work table, such that the film may become soiled or scratched.

SUMMARY OF THE INVENTION

It is an object of the present invention to improve a photographic copying and enlarging apparatus so that the aforecited problems are eliminated, without having to accept limitations relative to operation and ease of handling. In particular, the invention is intended to prevent lengths of film laterally suspended by the work table, from contacting the floor whereby they could become soiled or scratched.

According to the present invention, these objects are attained in a photographic copying and enlarging apparatus comprising a work table, a film stage located on the work table, a transport means located on the work table for transporting film along a film transport path and including a film transport roller on the film stage. A first clamping device, or front clamping device, is placed in front of the film transport path as viewed in the direction of film transport, for clamping one end of the film so that when its other end is threaded into the transport means, the film forms a loop whereby a length of film which hangs laterally from the work table on the film inlet side is reduced by at least one half.

BRIEF DESCRIPTION OF THE DRAWINGS

Other objects and advantages of the present invention will become apparent from the following detailed description of preferred embodiments as described in conjunction with the accompanying drawings in which:

FIG. 1 shows a schematic overall view of the apparatus in a vertical cross section along the transport path of the film F;

FIGS. 2 to 4 show three different variants of the clamping device designated 10 in FIG. 1, in a perspective view and at an enlarged scale;

DETAILED DESCRIPTION OF THE PREFERRED EMBODIMENTS

Figure 5:
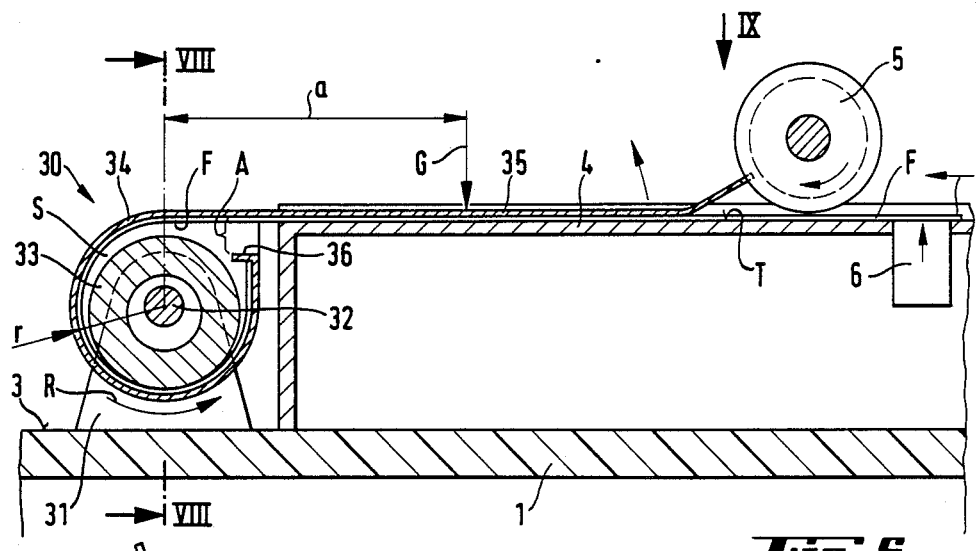
FIGS. 5 to 7 show an enlarged, detailed partial cross-section of FIG. 1 for different operating phases of the rear clamping device designated 30 in FIG. 1.

FIG. 1 shows only the most essential parts of the copying and enlarging apparatus that are relevant for the comprehension of the present invention. Referring to FIG. 1, the apparatus comprises essentially a work table 1 and a film stage 4 located upon the work table (or set into the work table). A copy light source 7, exposure optics 8, an imaging objective lens 9 and photosensitive copy material P, are further indicated schematically. A film transport roller 5 symbolizes the usual conveying means (rollers, grips) for conveying a photographic film F which is to be copied. The direction of transport in a film path is indicated by arrows. To this extent, the schematically illustrated apparatus corresponds to the state of the art, so that no detailed explanation is necessary.

According to the invention, the photographic copying and enlarging apparatus is additionally equipped with two clamping devices 10 and 30 for the film F. When viewed in the direction of transport of the film, the first device 10 is located in front and the second device 30 is located after the film stage 4 in the transport path of the film F. In keeping with their location, the clamping devices 10 and 30 are designated hereafter as the front clamp 10 and the rear clamp 30, respectively. These clamps 10 and 30, the configuration and mode of operation of which is described in detail hereinbelow, are used to hold the two ends of the film F to be copied, so that on the film input side and the film output side, the lengths of film laterally hanging from the work table are shortened by at least one half, so that there is no contact with the floor.

The variant shown perspectively in FIG. 2 of a front clamp 10 integrated in the edge 2 of the work table on the film input side, includes a clamp in the form of a roller clamp, with one clamping jaw being formed by a roller 17 and the other by a stationary counter surface 12. It comprises a recess 11 in the edge 2 of the work table. Bearing slots 14 are provided in the lateral walls of the recess 11 which are parallel to the transport direction. A roller 17 is supported in the recess by means of its journals 15 projecting from its frontal surfaces 16, in a rotatably and vertically displaceable manner. For better visibility, the roller 17 is shown in FIGS. 2 to 4 in a position not inserted in the bearing slots 14. Between said roller 17 and the counter surface 12, a terminal piece of the film F may be clamped by the weight of the roller. The weight of the roller 17 is chosen so that the resultant clamping force is sufficient to hold the clamped end of the film against the effect of gravity and on the other hand, the force of the film transport means is adequate to pull the clamped end of the film from the front clamp 10, without damaging the film F.

To preserve the longitudinal edges of the film F, the roller 17 and the recess 11 are wider than the commercial film formats.

In the detailed variants shown perspectively in FIGS. 3 and 4, the counter surface 12 is bevelled off outward and downward on the film input side. In FIG. 3, the bevelled counter surface 12 extends over the entire width of the recess 11, while in the variant of FIG. 4 it occupies only the center part of the recess 11. In the latter case, the width of the counter surface 12 should be slightly narrower than the smallest commercial film format. As a result of the bevelling, the counter surface 12 forms an obtuse angle with the vertical, whereby the length of the film suspended over it is additionally protected. Furthermore, heavier rollers 17 may also be used, as the contact pressure is applied only by the gravity force component which is perpendicular to the counter surface 12. The clamping force acting on the film F essentially is the product of said contact force and the coefficient of friction of the film F on the counter surface 12.

The roller 17 is preferably made of a light metal and is solid.

The depth of the recess 11 and of the bearing slots 14 are chosen so that the roller 17 projects with part of its circumference over the surface 3 of the work table. Any dragging of the film F drawn by the film conveyor on the surface 3 of the work table is thereby prevented.

In order to keep the contact range between the roller 17 and the film F as small as possible, the roller 17 is preferably tapered off inwardly in the form of a double cone as shown in FIG. 4. This limits the contact area of the roller 17 on the film F to 2 points on the longitudinal edges of the film F.

To protect the surface of the film, the surface of the roller 17 is polished.

It is particularly advantageous to mold the recess 11 with the bearing slots 14 and the counter surface 12 into the edge of the work table 1. This is most advantageously done during the course of molding the work table 1 from a plastic (for example PU foam).

In a variant embodiment intended as a retrofit kit for existing devices, the counter surface 12 and the bearing slots 14 for the journals 15 of the roller 17 are advantageously recessed in a single block, which is then mounted on the work table 1 in the transport path of the film F, preferably on the edge 2 of the work table.

In variant embodiments shown in FIG. 5 to FIG. 8 in cross section, a rear clamping device 30 comprises an essentially cylindrical housing 34, supported pivotally around an axle 32 fixedly attached to the work table 1 by means of bearing blocks 31. The pivot axle 32 extends under the film transport plane T. The pivot axle extends parallel to the film transport plane and is vertically offset with respect to the film transport device. The housing 34 is equipped with an axially parallel film inlet slot A for the film F and passes into a tongue 35 projecting in an approximately tangential manner from the upper edge of the film inlet slot A.

In the rest position (FIG. 5) of the housing 34, the tongue 35 extends with its upwardly bent end just to the film transport roller 5 and forms an upper film guide between the film transport roller 5 and the film inlet slot A located in the film transport path. On the film inlet side, a stop 36 projecting inward is provided under the edge of the film inlet in the housing 34 for the front end of the film. In a preferred embodiment, the housing 34 is angled off inwardly at the lower edge of the film inlet, thereby forming the stop 36. In the housing 34, a freely located roller 33 is present. The diameter of the roller 33 is slightly smaller than the diameter of the housing, so that a gap S of sufficient width is present between the roller 33 and the inner wall of the housing to permit without difficulty the penetration of the front end of the film between the roller 33 and the inner wall of the housing through the contact area of the housing 34 and the roller to the stop 36.

Due to the tongue 35, the center of gravity of the housing 34 with the roller 33 and the tongue 35 is located in the rest position (FIG. 5) in front of the pivot axle 32. In order to prevent the rear clamping device 30 from being caused to pivot around the axle 32 even upon the entrance of the front end of the film between the inner wall of the housing and the roller 33 by the frictional force generated, it must offer adequate resistance. This may be effected, for example, by means of appropriate braking devices. However, it is accomplished most advantageously by a suitable dimensioning of the tongue 35. (The product of the weight G of the tongue 35 and the distance a of the center of gravity from the axle 32 must be slightly larger than the product of the friction force R generated by the penetration of the film F between the housing 34 and the roller 33 to the stop 36, and the radius r of the housing 34).

Figure 6:
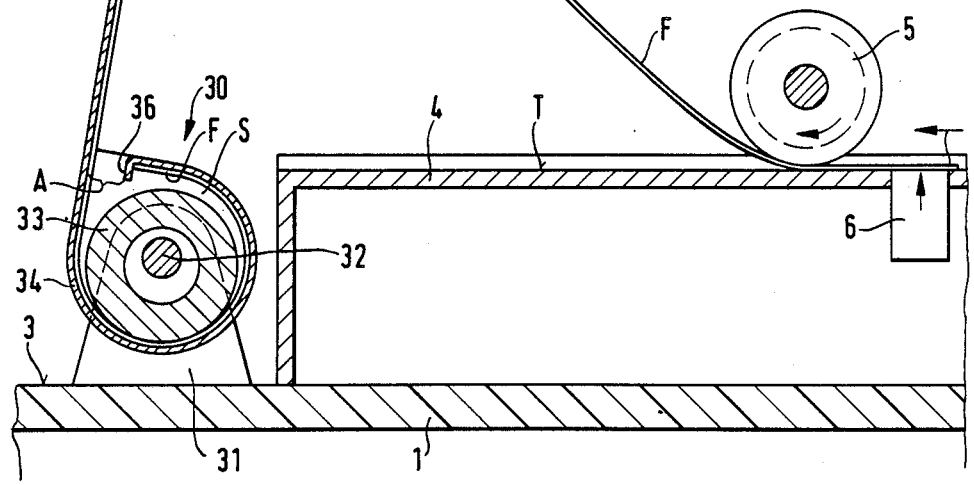

Beginning at the point in time at which a film F entering the housing 34 reaches the stop 36 with its front edge, the housing 34 is pivoted from its rest position upward during the further transport of the film F. This phase is shown in FIG. 6. When the housing is pivoted to a point at which the film guide tongue 35 attains a "12 o'clock" position, the housing 34 tilts into the position shown in FIG. 7. The front end of the film is clamped between the housing 34 and the roller 33 and is held by the weight of the roller 33. During the further transport of the film, a loop is again formed (as on the inlet side), which hangs laterally from the work table 1 on the film outlet side. But in view of the shortening of the length of the film hanging from the work table by at least one half, there is no contact with the floor.

Figure 7:
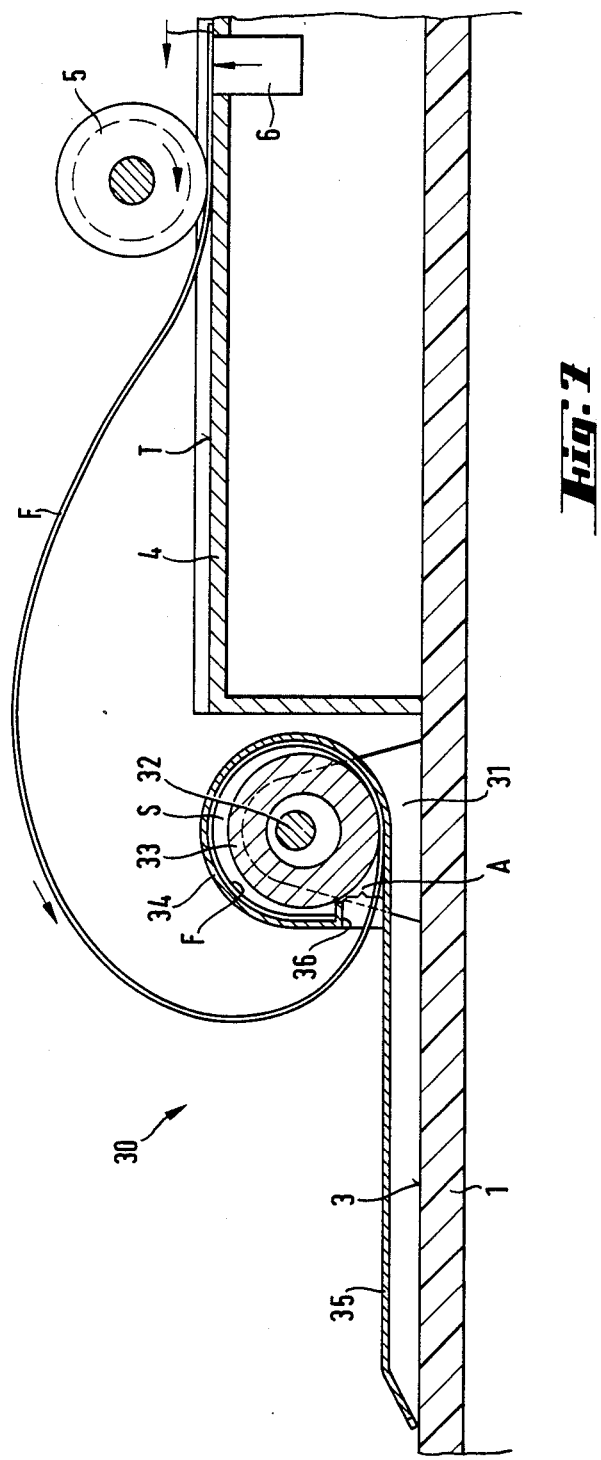

In FIG. 7, the housing 34 is pivoted by 180° relative to the rest position (FIG. 5), but a pivoting by at least more than 90° would suffice to prevent the loop being formed from dropping in the direction of the film stage 4.

To preserve the surface of the film, the bottom side of the tongue 35, the inner wall of the housing 34 and the roller 33, have smooth surfaces.

Figure 8:
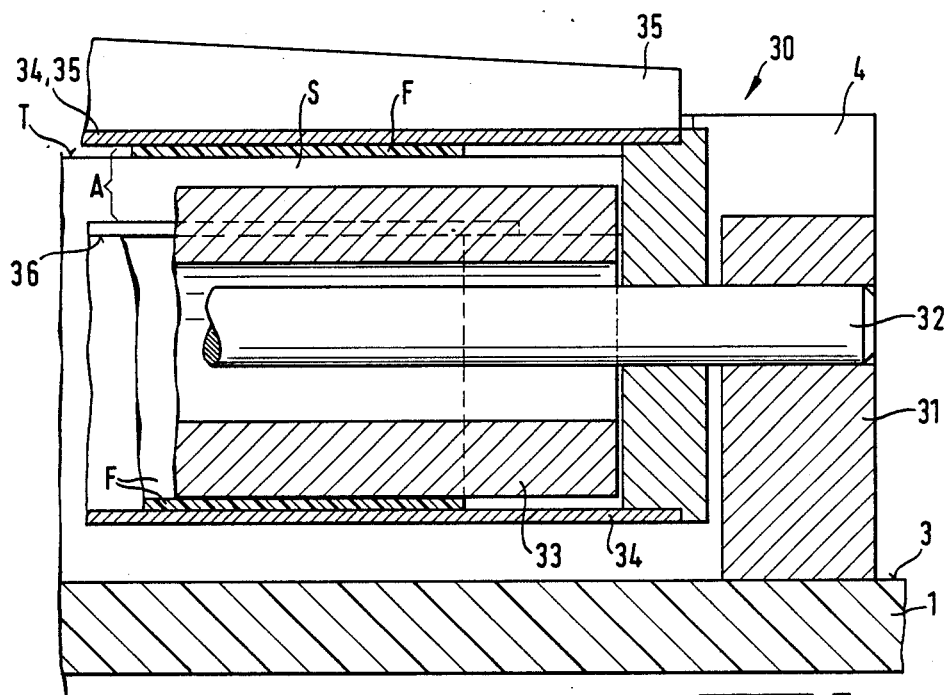
FIG. 8 shows a partial cross-section along the line VIII—VIII in FIG. 5.

The sectional view along the line VIII—VIII in FIG. 5, as shown in FIG. 8, is also correspondingly valid for an imaginary section of FIGS. 6 and 7.

FIG. 10 shows another variant embodiment of the rear clamping device 30 in a perspective view. The function of this variant is similar relative to the pivoting described in connection with FIGS. 5 to 7, with the exception that in this case the front end of the film is clamped between the tongue 35 and a flat spring 37 fastened to the bottom side of the tongue end on the axle side.

To preserve the surface of the film, the underside of the tongue and the spring 37 have smooth surfaces.

Figure 9:
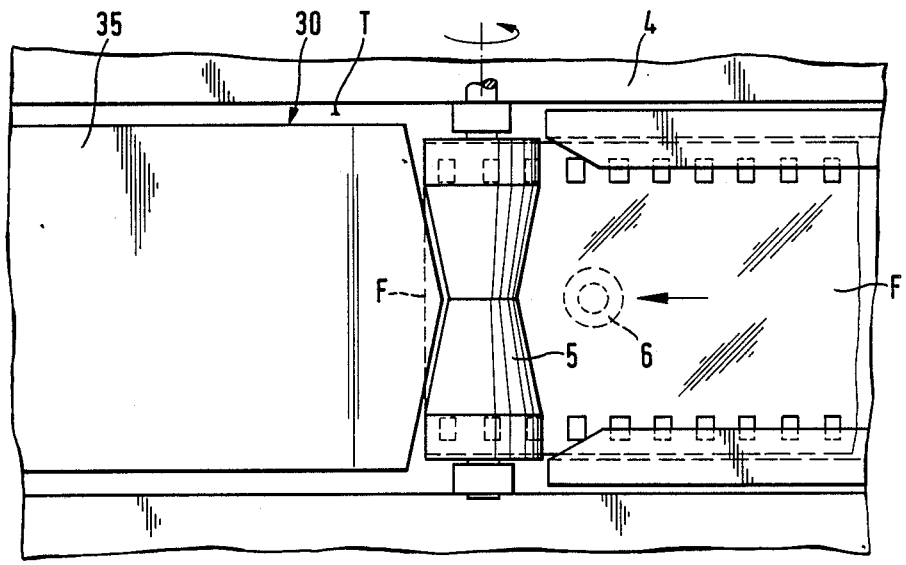
FIG. 9 shows an enlarged, partial top elevation of a detail in the direction of the arrow IX of FIG. 5; and, FIG. 10, shows a further variant of the embodiment of the rear clamping device designated 30 in FIG. 1, at a larger scale.

It frequently occurs that the front end of the film moved forward by the film transport roller 5 does not lie flat on the film transport plane T. In order to still assure the safe threading of the front end of the film into the rear clamping device 30, it is advantageous to configure the film transport roller 5 so that it is tapered off toward the inside in the shape of a double cone and to adapt the tongue 35 at its end on the transport roller side to the shape of the film transport roller, as shown in FIG. 9. The tongue 35, when in its rest position, is thus able to reach a position immediately in front of the film transport roller 5. In this manner the front end of a film having its longitudinal edges still being located under the transport roller 5, is already covered by the tongue 35 and thus cannot slide off the film guide during its further transport.

In FIG. 5, a detector 6 is shown immediately in front of the transport roller 5. The detector may be mechanical, but as a rule, photocells are used. When the rear end of the film passes the detector, the latter emits a signal to a control of a known type, whereby the film transport is stopped before the rear end of the film F leaves the active range of the film transport roller 5.

The manipulation and mode of operation of the apparatus described above will become more apparent from the following summary.

In small laboratories, the developed films F are usually suspended during movement by a suspension device of an appropriate height to the photographic copying and enlarging apparatus. The operator takes the terminal piece of the film hanging to the floor and, resting the film with its emulsion on the counter surface 12, clamps it into the front clamping device 10. The operator then releases the opposite end of the film from the suspension device and threads it into the film transport means located on the film stage with the film transport roller 5. The film transport means moves the film sliding over the roller 17. The film F forms a loop, which hangs laterally from the work table 1 on the film input side, but cannot come into contact with the floor in view of the shortening by at least one half of the hanging length of film.

The front end of the film F moved forward by the film transport roller 5 meets the rear clamping device 30, into which it is clamped. During the further transport of the film F, the rear clamping device 30 is pivoted and the loop being formed hangs laterally on the film outlet side from the work table 1, but due to the shortening of the hanging length of the film by at least one half, it cannot come into contact with the floor.

The detector located in front of the film transport roller 5 emits a signal upon the passing of the rear end of the film, which has been drawn by the film transport means from the front clamping device 10, to a control of a known type, whereby the film transport is halted before the rear end of the film leaves the action range of the film transport roller 5. This has the advantage that it is not necessary for the operator to continuously monitor the progress of the film F through the photographic copying and enlarging apparatus. The operator is now able to release the film F that is being held by the film transport roller 5 and the rear clamping device 30 and which is hanging laterally in a loop from the work table 1 without touching the floor due to the shortening by at least one half, by the application of a slight tensile force, from the apparatus and guide it to further processing.

It will be appreciated by those of ordinary skill in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. Photographic copying and enlarging apparatus comprising:
    a work table;
    a film stage located on the work table;
    a transport means located on the work table for transporting film along a film transport path and including a film transport roller on the film stage;
    a front clamping device located in front of a film transport path as viewed in a direction of film transport, for clamping one end of the film so that when its other end is threaded into the transport means, the film forms a loop whereby a length of film which hangs laterally from the work table on a film inlet side is reduced by at least one half.

2. Apparatus according to claim 1, further comprising:
    a rear clamping device located in the film transport path after the film stage as viewed in the direction of film transport, so that it grips and holds the film moved forward by the film transport roller at its front end, causing the film to form a loop during its further transport whereby a length of the film hanging laterally from the work table on a film outlet side is shortened by at least one half.

3. Apparatus according to claim 2, further comprising:
    a detector located in a transport plane of the film in front of the film transport roller as viewed in the direction of transport of the film, for detecting a passing of a rear end of the film and for halting the film transport before the rear end of the film leaves an action range of the film transport roller.

4. Apparatus according to claim 3, wherein the clamping force of the front clamping device is dimensioned so that the force of the film transport means is sufficient to draw the clamped film end from the front clamping device.

5. Apparatus according to claim 4, wherein the front clamping device is in the form of a roller clamp.

6. Apparatus according to claim 5, wherein said front clamping device includes clamping jaws, one of said clamping jaws being formed by a roller supported in a rotatably and vertically adjustable manner, and another of said clamping jaws being formed by a stationary counter surface.

7. Apparatus according to claim 6, wherein the clamping force is generated by the weight of the clamping device roller.

8. Apparatus according to claim 7, wherein the clamping device roller is wider than commercial film formats.

9. Apparatus according to claim 8, wherein said front clamping device further includes bearing slots, said clamping device roller being supported by journals projecting from its frontal surfaces in said bearing slots.

10. Apparatus according to claim 9, wherein the counter surface declines outwardly on the film inlet side and forms an obtuse angle with a vertical.

11. Apparatus according to claim 10, wherein the counter surface and the bearing slots for the journals are recessed in a single block.

12. Apparatus according to claim 11, wherein the counter surface is located on an edge of the work table.

13. Apparatus according to claim 9, wherein the counter surface and the bearing slots for the journals are recessed in a single block.

14. Apparatus according to claim 9, wherein the counter surface is located on an edge of the work table.

15. Apparatus according to claim 2, wherein the rear clamping device is pivotally mounted on the work table with a sufficiently high pivoting force which provides a clamping of the film against a friction force generated.

16. Apparatus according to claim 15, wherein a pivoting axle of the rear clamping device extends under a film transport plane, parallel to said plane and perpendicular to the film transport direction.

17. Apparatus according to claim 16, wherein the center of gravity of the rear clamping device, as viewed in the film transport direction, is located in front of the pivot axle.

18. Apparatus according to claim 17, wherein the rear clamping device is equipped with a tongue which, in a rest position, projects to the film transport roller and forms an upper film guide.

19. Apparatus according to claim 18, wherein the rear clamping device further comprises an essentially cylindrical housing with an axially parallel film inlet slot in the film transport path and a roller freely located in the housing, said rear clamping device roller having a diameter slightly smaller than the diameter of the housing, so that a penetration gap is present between the rear clamping device roller and an inner wall of the housing.

20. Apparatus according to claim 19, wherein the tongue projects in an approximately tangential manner from an upper edge of the film inlet slot, said rear clamping device further including a stop on the film inlet side which projects into the housing for stopping said other end of the film, after said other end passes a contact area of the housing and said rear clamping device roller.

21. Apparatus according to claim 20, wherein the film transport roller is formed as a double cone which tapers off inwardly, and an end of the tongue on the side of the transport roller is adapted to the shape of the transport roller.

22. Apparatus according to claim 18, wherein said rear clamping device further includes a flat spring mounted on the underside of an end of the tongue on the pivot axle side of the tongue, which together with the tongue forms a clamping gap for the film.

23. Apparatus according to claim 22, wherein the film transport roller is formed as a double cone which tapers off inwardly, and an end of the tongue on the side of the transport roller is adapted to the shape of the transport roller.

24. Apparatus according to claim 18, wherein the film transport roller is formed as a double cone which tapers off inwardly, and an end of the tongue on the side of the transport roller is adapted to the shape of the transport roller.

25. Apparatus according to claim 1, wherein said front clamping device includes bearing slots and a counter surface recessed into an edge of the work table.

26. Apparatus according to claim 25, wherein said front clamping device includes a roller which is supported in the bearing slots in a manner such that a portion of the clamping device roller is projecting over a circumference of a surface of the work table.

* * * * *